United States Patent [19]

Phillips

[11] 4,053,444

[45] Oct. 11, 1977

[54] COLLOIDAL POLYAMIC ACID ELECTRODEPOSITION COMPOSITIONS AND PROCESS FOR PREPARING SAID COMPOSITIONS

[75] Inventor: David C. Phillips, Pittsburgh, Pa.

[73] Assignee: Westinghouse Electric Corporation, Pittsburgh, Pa.

[21] Appl. No.: 571,131

[22] Filed: Apr. 24, 1975

Related U.S. Application Data

[63] Continuation of Ser. No. 245,396, April 19, 1972, abandoned.

[51] Int. Cl.$^2$ .................. C08J 3/08; C08K 5/20; C08K 5/41; C08K 5/34
[52] U.S. Cl. .................. 260/30.2; 204/181; 252/500; 260/30.8 DS; 260/32.6 NT; 260/32.8 N; 260/34.2
[58] Field of Search ............ 260/32.6 NT, 30.8 DS, 260/30.2, 32.8 N, 34.2; 204/181; 252/500, 518

[56] References Cited

U.S. PATENT DOCUMENTS

| | | | |
|---|---|---|---|
| 3,073,784 | 1/1963 | Endrey | 252/514 |
| 3,179,614 | 4/1965 | Edwards | 260/32.4 |
| 3,425,865 | 2/1969 | Shelton | 260/32.4 |
| 3,450,655 | 6/1969 | Spiller | 260/22 R |
| 3,463,714 | 8/1969 | Suomi et al. | 204/181 |
| 3,546,152 | 12/1970 | Bolton | 260/29.2 |
| 3,632,441 | 1/1972 | Bilow | 260/29.2 |
| 3,663,728 | 3/1972 | Hoback | 204/181 |
| 3,702,813 | 11/1972 | Tanaka et al. | 204/181 |
| 3,846,269 | 11/1974 | Martello et al. | 204/181 |

*Primary Examiner*—Allan Lieberman
*Attorney, Agent, or Firm*—D. P. Cillo

[57] ABSTRACT

A conducting non-aqueous colloidal polyamic acid electrodeposition composition is made by reacting (1) 1 part polyamic acid and 29–37 parts non-aqueous, organic solvent for the acid with (2) 0.8–1.2 parts of a nitrogen containing base to form an organic salt which is added to 50–150 parts of a non-aqueous, organic non-electrolizable, non-solvent for the acid salt.

13 Claims, No Drawings

COLLOIDAL POLYAMIC ACID ELECTRODEPOSITION COMPOSITIONS AND PROCESS FOR PREPARING SAID COMPOSITIONS

This is a continuation of application Ser. No. 245,396 filed Apr. 19, 1972, now abandoned.

BACKGROUND OF THE INVENTION

When a direct current potential is applied across an emulsion, suspension or solution containing charged particles or molecules, the latter migrate toward the electrode bearing the opposite charge. This phenomenon is generally called elctrophoresis and is utilized to apply coatings onto metallic surfaces for purposes of electrical insulation, paint priming, weather protection, and the like.

Most of the polymer electrophoretic deposition techniques followed in industry involve aqueous systems. However, aqueous depositions are in general markedly affected and vitiated by the evolution of gases at the electrodes. This gas evolution, deriving from water electrolysis can result in heavily pitted polymer coatings, which makes them particularly unsuitable for electrical insulation. Moreover, water emulsion systems are generally plagued by difficult-to-control surface tension, necessary pH conditions, and viscosity difficulties.

Polyimide resins have recently come into use as high temperature electrical insulating films. Polyimide films are generally produced by film casting of a non-aqueous solvent solution followed by a heat cure. Briefly, this involves dissolving a suitable polyamic acid polymer in a solvent, casting the solution uniformly upon a smooth surface and then slowly heating until a suitable polyimide insulating film is produced from the acid polymer derivative. A major problem with the solution casting method is that only relatively thin films (0.0001 inch for foil coatings) can be produced in a single coat. Heavier coating or film thickness required a multicoat system with each coat being dried and cured before applying the subsequent coat. Difficulty is also encountered with uniform coating of corners and particularly of sharp edges. Uniform polyimide coverage of irregular-shaped objects has proved practically impossible by solution casting and expensive equipment costs are encountered in this method.

As a partial solution, electrophoretic deposition techniques have been developed for polyamic acids in a water emulsion system, as described in U.S. Pat. No. 3,537,970. Such an aqueous polymer electrodeposition system, however still suffers the aforedescribed disadvantages of film pitting. Although most of the polymer electrophoretic deposition techniques applied in industry involve aqueous processes, a few organic systems, such as those shown in U.S. Pat. Nos. 3,450,655 and 3,463,714, have also been used. These systems have involved vinyl resins, epoxy resins, and carboxyl-containing polymers and copolymers such as polyacrylic acid, vinyl acetate/maleic acid copolymers, ethylene/itaconic acid copolymers and ethylene/maleic acid copolymers among others.

It has been found that a great number of variables exist in non-aqueous electro-deposited systems as regards the ratio between polymer and solvent and between solvents within the solvent system, and that each polymer used presents its own characteristic problems in its dilution or suspension and deposition.

SUMMARY OF THE INVENTION

In accordance with this invention, it has been found that the foregoing difficulties may be overcome so that exposed portions of regular and irregular-shaped electrical conductors can be uniformly heavily coated with good edge coverage and without pitting, in a single coating operation by the electrodeposition of a polyamic acid from a non-aqueous composition followed by a heat cure to produce the corresponding polyimide. This composition comprises a polyamic acid polymer, a nitrogen containing base and a dual solvent system consisting of a liquid, organic, non-aqueous solvent for the acid and a liquid, organic, non-aqueous, non-electrolizable non-solvent for the salt of the acid, the composition components having been subjected to critical addition steps to form a colloidal dispersion within critical weight percent ratios.

DESCRIPTION OF THE PREFERRED EMBODIMENTS

One of the cured imide films, after electrodeposition of polyamic acid polymer and subsequent heating in accordance with this invention comprises polymers of aromatic polyimides having the recurring unit:

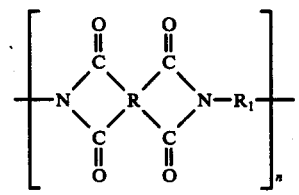

wherein $n$ is at least 15, R is at least one tetravalent organic radical selected from the group consisting of:

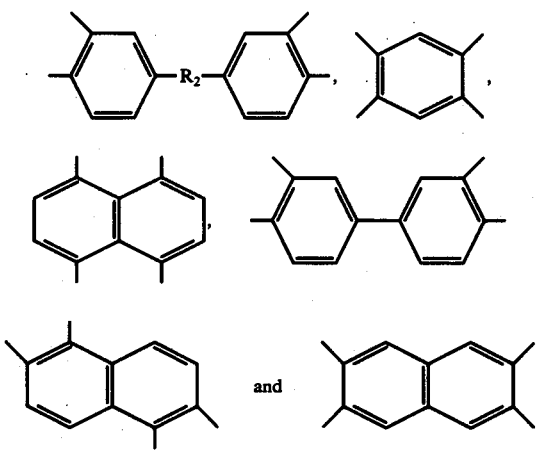

$R_2$ being selected from the group consisting of divalent aliphatic hydrocarbon radicals having from 1 to 4 carbon atoms and carbonyl, oxy, sulfo and sulfonyl radicals and in which $R_1$ is at least one divalent radical selected from the group consisting of:

-continued

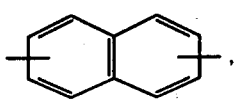

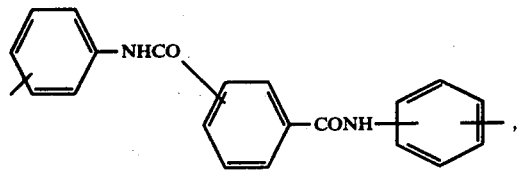

and

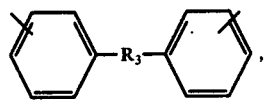

in which $R_3$ is a divalent organic radical selected from the group consisting of $R_2$, silico and amido radicals. Polymers containing two or more of the R and/or $R_1$ radicals, especially multiple series of $R_1$ containing amido radicals, are particularly valuable in some instances. The aromatic polyamide-imide resins, represented by certain of the foregoing formulae are described and claimed in U.S. Pat. No. 3,179,635.

The described essentially insoluble, cured, high temperature films are derived from certain soluble aromatic polyamic acids in solvent solutions. In the present invention the polyamic acid is reacted to form a salt in a dual solvent system. The precursor film after application to a suitable metallic or other type electrically conductive substrate by electrodeposition method is heated for a time sufficient to cure the precursor film to its solid resinous state.

In general, the soluble polyamic acid precursors are prepared by admixing a suitable aromatic tetracarboxylic dianhydride with an aromatic diamine in a suitable solvent at room temperature. The admixture or solution is stirred until a maximum viscosity is reached. Examples of suitable dianhydrides are pyromellitic dianhydride, benzophenone tetracarboxylic dianhydride, naphthalene tetracarboxylic dianhydride and the like. Examples of suitable diamines are m-phenylene diamine, methylene dianiline, diaminodiphenyl ether, diaminobenzanilide and the like. References which describe the procedure in greater detail are U.S. Pat. Nos. 3,179,635, 3,179,614, 3,179,631, 3,179,632, 3,179,633, and 3,179,634. The polyamic acid precursors are well known and commercially available in solvent solutions.

The same general procedure is employed when a derivative of an aromatic tricarboxylic anhydride, e.g., trimellitic anhydride chloride or the ester diacid chloride of trimellitic anhydride is used in place of the aforesaid aromatic dianhydride. The above-named diamines are, of course, also suitable for use with the tricarboxylic anhydride derivatives.

One of the organic aromatic polyamic acid polymers suitable for use as a soluble polyamic acid precursor in this invention has the recurring unit:

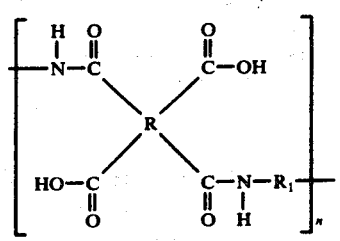

in which $n$ is at least 15 and R and $R_1$ are identical to the description hereinabove relating to the solid aromatic polyimide and polyamide-imide resins. It should be understood that suitable polyamic acids may also contain two or more of the R and/or $R_1$ radicals.

Suitable solvents for the polyamic acids are aprotic solvents, i.e., solvents which will neither lose a proton to the solute nor gain a proton from the solute, for example, the normally liquid organic solvents of the N,N-dialkylcarboxylamide class, preferably the lower molecular weight members of this class, such as dimethyl acetamide, dimethyl formamide, and N-methyl-2-pyrrolidone. Other useful aprotic solvents include dimethyl sulfoxide and pyridine. The solvents can be used individually or in combinations of two or more. The solvents are easily removed by heating in a drying tower or oven.

In addition to the aforementioned aromatic polyimide and polyamide-imide recurring unit wherein R was a tetravalent organic radical, other cured resins which are particularly suitable as films which can be electrodeposited in accordance with this invention are derived from a trivalent anhydride and have the structure:

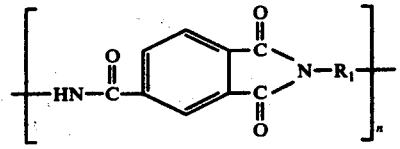

wherein $R_1$ and $n$ are identical to he description hereinabove relating to the solid aromatic polyimide and polyamide-imide resins.

Particularly valuable films are provided when $R_1$ is

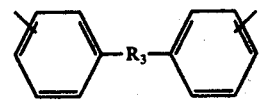

where $R_3$ is an oxy or methylene ($-CH_2-$) radical.

The soluble organic polyamic acid precursors for the above trivalent derived polyamide-imide resins include in repeating form one or both of the structures:

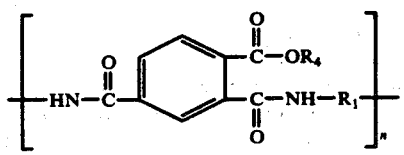

and

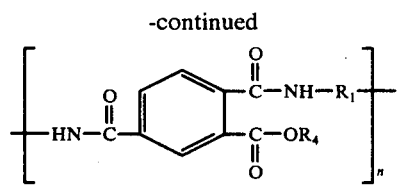

wherein $R_1$ and $n$ are identical to the description hereinabove and $R_4$ is selected from the group consisting of —H, alkyl or aryl radicals. For details on the preparation of these soluble polyamic acids and the solid resins therefrom, reference may be had to British Pat. Nos. 1,356,564 and 1,032,649. The same solvents as previously described can be used for the above aromatic polyamic acids.

In the process of this invention, polyamic acids have been successfully electrodeposited from colloidal dispersions of amine salts of the same polyamic acids in mixed organic solvent systems. The electrically conducting composition of this invention consists of a colloidal dispersion of the organic amine salt of the polyimide precursor within a critically balanced organic solvent mixture and has a pH range between 8–10. Resin solutions for this process are formulated at much lower solids contents than resin solutions used in conventional solution casting and most electrodeposition methods. The low solids content used is necessary in this electrodeposition technique and results in extremely low solution viscosity which assures rapid solution drain off and elimination of any runs and sags on the coated article. The solids content for the electrodeposition composition should be between about 0.5–1.5 wt.% based on polyamic acid and total solvent.

The process is highly complex and probably involves polymer salt formation:

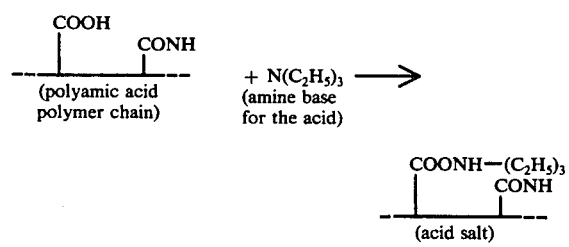

Under the influence of an electric field it is envisaged that the salt ionizes to produce the triethylammonium ion and carboxyl ion of the polymer which subsequently migrate to cathode and anode respectively:

Anode reactions lead to the reconstitution of the parent polyamic acid, which on subsequent heat cure loses water to produce the corresponding polyimide film. Possible anode reactions are:

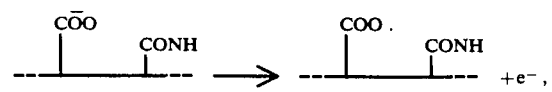

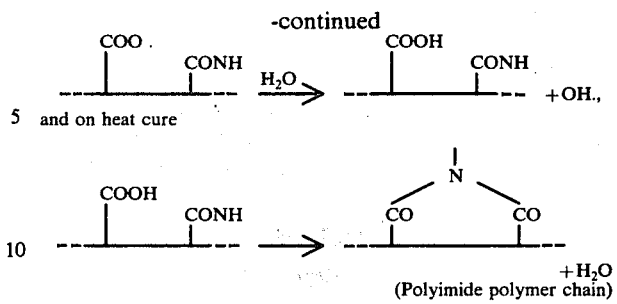

(Polyimide polymer chain)

The non-aqueous medium in which the acid salt is dispersed consists of a liquid, non-electrolizable solvent which is not capable of dissolving the acid salt of the polymer chain. This non-solvent for the acid salt polymer must not gas to any great extent at the electrodes due to electrolysis when a voltage is applied to the system. Preferred solvents are non-electrolizable solvents which are a non-solvent for the acid salt of the polymer and would include liquid aliphatic (straight and branched chain) and aromatic ketones, such as, for example, acetone, methyl isobutyl ketone, methyl ethyl ketone, methyl n-propyl ketone, diethyl ketone, mesityl oxide, cyclohexanone, methyl n-butyl ketone, ethyl n-butyl ketone, methyl n-amyl ketone acetophenone, methyl n-hexylketone, isophorone and and diisobutylketone.

The basic organic nitrogen containing compounds which react with the acid polymer to form a stable acid salt include organic tertiary aliphatic and aromatic amines such as, for example trimethylamine, triethyl amine, N, N-dimethylbenzylamine, tri-n-propylamine, tri-n-butylamine, N-ethylpiperidine, N-allypiperidine, N-ethylmorpholine, N,N-diethyl-m-toluidine, N,N-diethyl-p-toluidine, N-allylmoropholine, N,N-diethylaniline, pyridine and imidazole, amines such as, for example, imidazole 1-methylimidazole, 4-methylimidazole, 5-methylimidazole, 1-propylimidazole, 1,2-dimethylimidazole, 1-ethyl-2-methylimidazole and 1-phenylimidazole.

In preparation of the electrodeposition composition the component materials must be added within critical wt.% ratios. The process for preparing the colloidal dispersion consists of (1) reacting a polyamic acid polymer in a non-aqueous organic solvent solution, which is preferably non-electrolizable, with a nitrogen containing base selected from the group consisting of amines and imidazoles to form an acid salt, (2) adding the salt solution to a non-aqueous, organic non-solvent for the polyamic acid salt which is substantially non-electrolizable, to provide the colloidal dispersion of the salt within the solvent mixture.

The electrodeposition composition is formed by addition of about 1 part by weight polyamic acid polymer, about 29–37 parts solvent for said acid, about 0.8–1.2 parts nitrogen containing base and about 50–150 parts non-solvent for the salt of the acid. Under 29 parts solvent for the polymer will cause viscosity problems and precipitation and over 37 parts solvent for the polymer will impede electrocoating because the polymer will stay in solution. Under 50 parts non-solvent for the acid salt will impede electrocoating because the polymer will stay in solution. Over about 150 parts non-solvent for the acid salt will cause precipitation of the polymer within the two-solvent medium. Substitution of any compounds for the solvents or bases which are electrolizable, such as water, methanol, ethanol, ammonium hydroxide inorganic type base and aqueous sodium or potassium hydroxide solution will cause pitting in the final electrodeposited film. Small effective amounts of filler particles as such or as finely divided pigments or lubricants can be added to the composition for a variety of end uses, such as colored coated panels or thin antifriction films.

EXAMPLE 1

A polyamic acid electrodeposition composition was formed by: (1) mixing 33 grams of polyamic acid polymer dissolved in 179 grams of solvent for the polymer (200 ml. of a polyimide wire enamel solution having 16.5 wt.% solids content and sold commercially by DuPont under the tradename Pyre M. L. Polyimide Wire Enamel) with 875 grams (800 ml.) of dimethylsulfoxide solvent for the polymer; adding 29 grams (40 ml.) of triethylamine dropwise to produce the amine salt having free carboxyl groups present. The resulting solution, containing 0.9 parts by weight organic amine and 33 parts by weight combined solvent for the polymer to 1 part acid polymer, was vigorously stirred, heated to about 40° C., and held at that temperature for 20 minutes; (2) this solution was added with vigorous stirring to 2515 grams (3200 ml.) of acetone, a non-solvent for the acid salt, to provide a composition containing 76 parts by weight non-solvent for the acid salt to 1 part acid polymer.

About 300 ml. of this electrodeposition composition, having a pH of about 8–9, was added to a 500 ml. Pyrex glass reaction kettle with two 2 inches × 1 inch × 0.02 inch copper electrodes (anode and cathode) connected to a variable voltage d.c. power supply. The anode to cathode separation through the electrodeposition composition was 1 inch. A potential difference of 100 volts was applied for one minute. Under the influence of the electric field it is envisaged that the salts ionizes to produce the triethylammonium ion and carboxyl ion of the polymer, which subsequently migrate to cathode and anode respectively. During this time the current decreased from an initial value of 40 mA. to 20 mA. and produced an adherent coating on the anode without any gassing of the composition. Current densities were about 10 mA/sq. in. of electrode surface.

The coated electrode was removed from the collodial polyamic acid electrodeposition composition and slowly heated from 50° to 320° C. in a convection oven over a period of two hours. The final cure consisted of one hour heating at 320° C. A very tough, pin hole free, flexible film coating with good edge coverage one mil thick (0.001 inch) was produced. Increased electrolysis times produced thicker coatings up to 3.0 mils. For short electrolysis times, less than 30 minutes, there was no necessity to stir the composition and no precipitation or agglomeration of the resin was seen. The composition could be stored up to five days without loss of stability. The resin content of the bath could be completely depleted without showing any adverse effects on the properties of the final coating.

Similar films have been produced on aluminum, copper, nickel, stainless steel and platinum electrodes using N,N-dimethyl benzylamine and 1-methylimidazole as the nitrogen containing compounds. Small amounts of pigments and finely divided solid lubricants have also been included in these compositions. Other polyimide resin precursors have also been used as a substitute for the Pyre M. L. Excellent results have been achieved with polypyromellitamic acid precursor solution formed by condensation of pyromellitic dianhydride with 3,4'-diaminobenzanilide in stoichiometric proportions in dimethylacetamide as solvent for the polymer, to form a solution having a solids content of about 18 wt.% at a 2–3 Gardner Holt viscosity at 25° C. The cured resin has also been stripped from the metal to give films that could be creased and flexed many times without cracking and this flexibility was not changed after aging the films for 100 hours at 300° C. in air.

EXAMPLE 2

A polyamic acid electrodeposition composition was formed with Pyre M. L. exactly as in EXAMPLE 1, except that 41.5 grams (40) ml. of 1-methylimidazole was substituted for the triethylamine.

All 4240 ml. of the composition was added to a 12 inches × 8 inches × 4 inches rectangular stainless steel tank. The tank was made the cathode while the anode was a piece of aluminum sheet 6 inches × 8 inches × 0.02 inch centrally immersed in the composition. Fifteen such aluminum pieces were successively coated employing a constant voltage of 100 volts and currents ranging from 800 to 300 mA providing a current density of about 1.0 mA./sq. in. of electrode surface for an average time of about 2 minutes. Coating thicknesses were all in the 0.9 to 1.2 mils range, with excellent edge coating and no pinholes, after curing as in EXAMPLE 1. The following tests were carried out on the second panels:

BREAKDOWN VOLTAGE

Determinations were made of the breakdown voltages at various positions on the coated panel by connecting the panel to ground and positioning a rounded 1 inches electrode on the film surface. A 60 Hz power supply was employed to perform dielectric strength tests in accordance with ASTM Standard test D149. The d.c. potential difference between the grounded plate and rounded electrode was increased until breakdown occurred. Ten random positions were taken on each panel giving collectively a total of 150 breakdown observations. The breakdown values obtained were in the 2.5 to 5.0 KV/mil range with an average value of 4.0 KV/mil.

The entire experiment was repeated using fifteen identically sized copper panels in place of the aluminum panels. Breakdown values were in the range of 2.9 to 5.2 KV/mil with an average value of approximately 4.0 KV/mil.

ADHESION AND FLEXIBILITY

A standard Conical Mandrel test was performed on five of the polyimide coated aluminum panels. All coatings showed no cracking, chipping or loss of adhesion down to a ⅛' bend. Similar results were obtained on five polyimide coated copper panels.

THERMAL TESTS

A series of ten coated aluminum panels and ten coated copper panels were placed in a well-thermostated over at 250° C. The object of the experiment was to determine what effect thermal aging had on the properties of breakdown voltage, adhesion and flexibility. Tests made after 10,000 hours exposure showed no significant property differences from those samples which had not been subjected to thermal aging. Insulation resistance of the coating is infinite when dry and about $5 \times 10^5$ megohms after boiling for 10 minutes in water. These tests indicate that the films produced by this method compare very favorably with solution cast polyimide films which generally have dielectric strengths of 3.4 KV/mil and thermal lives of about 20,000 hours at 250° C.

Similarly, an anode comprised of a degreased six-inch copper hexagonal form-wound coil was centrally immersed in the composition described above. A potential difference of 40 volts (500 mA) was applied between the conductive body and a counter electrode for a period of one minute. The coil was removed from the bath and heat-cured. This produced a continuous, smooth, pinhole free polyimide coating on the irregular shaped coil. An apparent dielectric strength of 2200 volts was obtained when the coil was completely immersed in mercury and subjected to a potential (60 Hz power supply) increasing at 500 volts/sec.

Electrodeposited polyimide films retain their mechanical and physical properties over a wide temperature range. This ability proves itself especially useful in applications which have high operating temperatures.

I found that when the acetone component of the composition was replaced by water, which will electrolize, the polyimide coatings that are formed do not adhere very well and are heavily pitted, even when very low potential differences are applied, due to water electrolysis (gaseous products) at the anode, making the coatings disadvantageous for electrical applications in contrast to the coatings of EXAMPLES 1 and 2.

I claim:

1. A method of making a nonaqueous, colloidal, polyamic acid electrodeposition composition comprising the steps of:
    A. providing a salt solution comprising: 1 part by weight of organic aromatic polyamic acid, about 29-37 parts by weight of a non-aqueous, organic, non-electrolizable, aprotic solvent for the polyamic acid and an amount of nitrogen containing base, selected from the group consisting of tertiary amines and imidazoles effective to form an organic acid salt, and
    B. adding the salt solution to about 50-150 parts by weight of a non-aqueous, organic, non-electrolizable, non-solvent for the salt which is not capable of dissolving the acid salt, to provide a colloidal dispersion of the salt within the solvent mixture,
the composition having a pH of between 8-10 and a solids content of between about 0.5 wt.% to about 1.5 wt.% based on polyamic acid and total solvent.

2. The method of claim 1 wherein about 0.8-1.2 parts of nitrogen containing base is added in step (A) for each 1 part of polyamic acid, the non-solvent for the salt is a ketone, and the solvent for the polyamic acid is selected from the group consisting of N,N-dialkylcarboxylamides, dimethylsulfoxide, pyridine and mixtures thereof.

3. The method of claim 2 wherein the nitrogen containing base is selected from the group consisting of trimethyl amine, triethylamine, N, N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N,N-diethylaniline pyridine, imidazole, 1-methylimadazole, 4-methylimidazole, 5-methylimidazole, 1-propylimidazole, 1,2-dimethylimidazole, 1-ethyl-2-methylimidazole and 1-phenylimidazole and the non-solvent for the salt is selected from the group of ketones consisting of acetone, methyl isobutyl ketone, methyl ethyl ketone, methyl n-propyl ketone, diethyl ketone, mesityl oxide, cyclohexanone, methyl-n-butyl ketone, ethyl-n-butyl ketone, methyl-n-amyl ketone, acetophenone, methyl-n-hexyl ketone, isophorone and di-isobutyl ketone.

4. A colloidal polyamic acid electrodeposition composition comprising a colloidal dispersion of organic acid salt within a solvent mixture, said acid salt being the reaction product of 1 part by weight of organic aromatic polyamic acid and about 0.8-1.2 parts by weight of nitrogen containing base, selected from the group consisting of tertiary amines and imidazoles, and said solvent mixture comprising about 29-37 parts by weight of a non-aqueous organic, non-electrolizable, aprotic solvent for the polyamic acid and about 50-150 parts by weight of a non-aqueous, organic, non-electrolizable non-solvent for the salt which is not capable of dissolving the acid salt, the composition having a pH of between 8-10 and a solids content of between about 0.5 wt.% to about 1.5 wt.% based on polyamic acid and total solvent.

5. The composition of claim 4 wherein the non-solvent for the salt is a ketone.

6. The compositions of claim 5 wherein the nitrogen containing base is selected from the group consisting of trimethylamine, triethylamine, N,N-dimethylbenzylamine, tri-n-propylamine, tri-n-butylamine, N-ethylpiperidine, N-allylpiperidine, N-ethylmorpholine, N,N-diethyl-m-toluidine, N,N-diethyl-p-toluidine, N-allylmorpholine, N, N-diethylaniline pyridine, imidazole, 1-methyl-imidazole, 4-methylimidazole, 5-methylimidazole, 1-propylimidazole, 1,2-dimethylimidazole, 1-ethyl-2-methylimidazole and 1-phenylimidazole and the non-solvent for the salt is selected from the group of ketones consisting of acetone, methyl isobutyl ketone, methyl ethyl ketone, methyl n-propyl ketone, diethyl ketone, mesityl oxide, cyclohexanone, methyl-n-butyl ketone, ethyl-n-butyl ketone, methyl-n-amyl ketone, acetophenone, methyl-n-hexyl ketone, isophorone and di-isobutyl ketone.

7. The composition of claim 4 wherein the polyamic acid is selected from the group of polyamic acids having the structure:

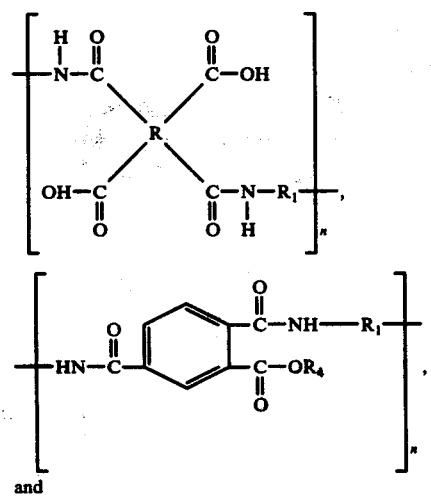

and

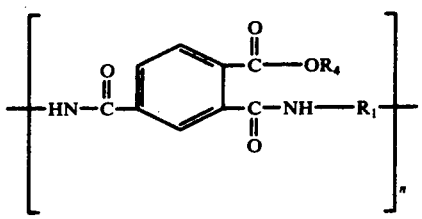

wherein n is at least 15, R is at least one tetravalent organic radical selected from the group consisting of:

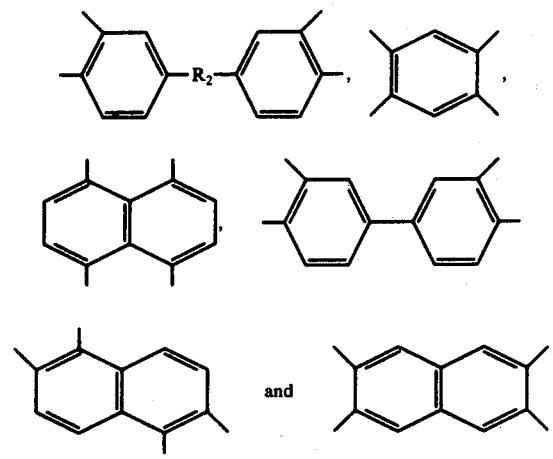

$R_2$ being selected from the group consisting of divalent aliphatic hydrocarbon radicals having from 1 to 4 carbon atoms and carbonyl, oxy, sulfo and sulfonyl radicals, $R_1$ is at least one divalent radical selected from the group consisting of:

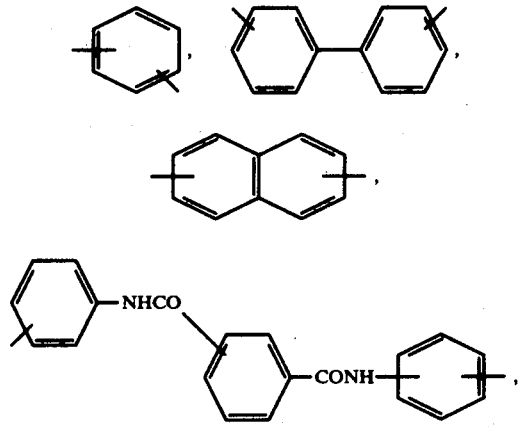

in which $R_3$ is a divalent organic radical selected from the group consisting of $R_2$, silico and amido radicals and in which $R_4$ is selected from the group consisting of: —H, alkyl and aryl radicals.

8. The composition of claim 7 wherein the solvent for the acid is selected from the group consisting of N,N-dialkylcarboxyamides, dimethyl sulfoxide, pyridine and mixtures thereof.

9. The composition of claim 7 wherein the solvent for the acid is selected from the group consisting of dimethyl acetamide, dimethyl formamide, N-methyl-2-pyrrolidone, dimethyl sulfoxide and pyridine and mixtures thereof.

10. The composition of claim 7 also containing an effective amount of finely divided filler particles.

11. The composition of claim 7 wherein R is at least one tetravalent organic radical selected from the group consisting of:

12. The composition of claim 11 wherein $R_1$ is

13. A colloidal polyamic acid electrodeposition composition comprising a colloidal dispersion of organic acid salt within a solvent mixture, said acid salt comprising 1 part by weight of organic aromatic polyamic acid and an amount of 1 methyl imidazole effective to form an organic acid salt, said solvent mixture comprising about 29–37 parts by weight of an organic solvent for the polyamic acid selected from the group consisting of dimethylsulfoxide, N-methyl-2-pyrrolidone and mixtures thereof and about 50–150 parts by weight of an organic non-solvent for the salt which is not capable of dissolving the salt selected from the group consisting of methyl ethyl ketone, acetone and mixtures thereof, wherein the pH of the composition is between 8–10, and the solids content of the composition is between about 0.5 wt.% to about 1.5 wt.% based on polyamic acid and total solvent.

* * * * *